United States Patent [19]

Ahern et al.

[11] 4,412,738
[45] Nov. 1, 1983

[54] VACUUM DOCUMENT FEEDER

[75] Inventors: Douglas K. Ahern, Penfield; Edwin E. Cleaveland, III, Rochester, both of N.Y.

[73] Assignee: Eastman Kodak Company, Rochester, N.Y.

[21] Appl. No.: 289,685

[22] Filed: Aug. 3, 1981

Related U.S. Application Data

[63] Continuation of Ser. No. 142,534, Apr. 21, 1980, abandoned.

[51] Int. Cl.$^3$ .............................................. G03B 27/64
[52] U.S. Cl. ...................................... 355/76; 271/197; 271/276
[58] Field of Search .................. 271/197, 276, 94, 96, 271/245, 246; 355/3 SH, 76, 14 SH; 198/689, 811; 226/95

[56] References Cited

U.S. PATENT DOCUMENTS

| | | | |
|---|---|---|---|
| 2,799,205 | 7/1957 | Bacsik | 355/76 |
| 3,451,754 | 6/1969 | Prew | 355/76 X |
| 3,698,706 | 10/1972 | Mihojevich et al. | 271/197 X |
| 3,799,541 | 3/1974 | Buccicone | 271/197 |
| 3,904,188 | 9/1975 | Fairbanks et al. | 271/276 X |
| 4,033,694 | 7/1977 | Ferrari | 355/76 |
| 4,043,550 | 8/1977 | Phillips et al. | 271/233 |
| 4,043,665 | 8/1977 | Caldwell | 355/76 |
| 4,047,812 | 9/1977 | Hogan | 355/76 |
| 4,135,808 | 1/1979 | Morrison | 355/14 SH |
| 4,294,540 | 10/1981 | Thettu | 355/76 |

OTHER PUBLICATIONS

"Fluorescing Document Belt", *Xerox Disclosure Journal*, vol. 4, No. 1, Jan./Feb. 1979, p. 65.

*Primary Examiner*—Bruce H. Stoner, Jr.
*Attorney, Agent, or Firm*—Lawrence P. Kessler

[57] ABSTRACT

A vacuum document feeder which transports a document page in juxtaposition to an illumination platen of a reproduction apparatus where such page is illuminated for copying. The feeder includes a vacuum plenum having a reflective wall formed with a plurality of spaced ports overlying the exposure platen. A ported transport belt is moved in contact with the plenum wall to feed a document page to the platen for copying. The moving belt is positioned on the plenum wall so that the belt ports are maintained in spaced relation to the wall ports. Further, the wall ports and the belt ports are fluidically inter-connected so that vacuum within the plenum is effective to tack a document page to the moving belt for movement to the exposure platen. This structural arrangement prevents light trapping by the wall ports during illumination of such document page.

5 Claims, 3 Drawing Figures

VACUUM DOCUMENT FEEDER

This is a continuation of application Ser. No. 142,534, filed Apr. 21, 1980, now abandoned.

BACKGROUND OF THE INVENTION

This invention relates generally to a feeder for transporting document pages seriatim across the exposure station of a reproduction apparatus, and more particularly to a vacuum document feeder which reduces the formation of undesirable artifacts on the copies of such document pages.

In order to efficiently utilize commercially available high-speed reproduction apparatus, such as electrophotographic copier/duplicators, document pages to be copied are automatically transported seriatim to and from the exposure station of the apparatus. One typical transport mechanism is a vacuum document feeder, such as that shown, for example, in U.S. Pat. No. 4,043,665, issued Aug. 23, 1977 in the name of Caldwell. Such a feeder employs an endless ported belt supported to traverse a path overlying the exposure station of the reproduction apparatus. A vacuum plenum associated with the belt tacks a document page to the belt for transport across the exposure station.

Some vacuum document feeders may cause undesirable artifacts to be produced in the copies of the document pages. These artifacts are caused by trapping of light during exposure of the document page at the exposure station. Light trapping frequently occurs when ports in the transport belt are superpositioned on the ports in the vacuum plenum. During exposure light passes through the belt and plenum ports when the document page does not fully cover the exposed belt area, or when the page is thin enough to transmit light (e.g., 16-pound paper). Light passing through the plenum ports is trapped within the plenum. The superimposed belt and plenum ports thus appear as dark spots, or shadows, in the reflected light image and are reproduced in the copies as undesirable artifacts.

Several means for reducing or eliminating the production of artifacts have been tried. For example, the transport belts may be formed of material such as porous foam or cloth, having vacuum apertures which do not extend directly from the front surface to the back surface of the belt. However, such materials typically do not have desirable wear characteristics, or are subject to clogging of the apertures, for example by paper and dust particles. Another means for reducing light trapping is shown in U.S. Pat. No. 4,047,812, issued Sept. 13, 1977, in the name of Hogan. The perforated transport belt in that patent has endless parallel imperforate bands. These bands lie in the areas corresponding to the top and bottom marginal edges of certain standard size document pages transported by the belt. Since the imperforate bands form a continuous reflective surface adjacent to such marginal edges, artifacts are reduced in the corresponding areas of the copies. However, artifacts may still be produced in the other areas of the copy (i.e., in the areas along the longitudinal opposed marginal edges, or in the case of thin document pages, within the body of the copy).

SUMMARY OF THE INVENTION

This invention is directed to a vacuum document feeder which substantially reduces the production of undesirable artifacts on copies of illuminated document pages. The vacuum feeder transports a document page in juxtaposition to a exposure platen of a reproduction apparatus where such page is illuminated for copying. The feeder includes a vacuum plenum having a wall formed with a plurality of spaced ports overlying the exposure platen. A ported transport belt is moved in contact with the plenum wall to feed a document page to the platen for copying. The moving belt is positioned on the plenum wall so that the belt ports are maintained in spaced relation to the wall ports. Further, the wall ports and the belt ports are fluidically interconnected so that vacuum within the plenum is effective to tack a document page to the moving belt for movement to the exposure platen. This structural arrangement prevents light trapping by the wall ports during illumination of such document page. As further aspects of the invention, such fluidic interconnection is provided by a plurality of shallow concave grooves in the plenum wall intersecting the plurality of ports respectively in the wall; and the transport belt, the plenum wall, and the grooves have a reflective surface.

The invention, and its objects and advantages, will become more apparent from the detailed description of the preferred embodiment presented below.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Figure 1:
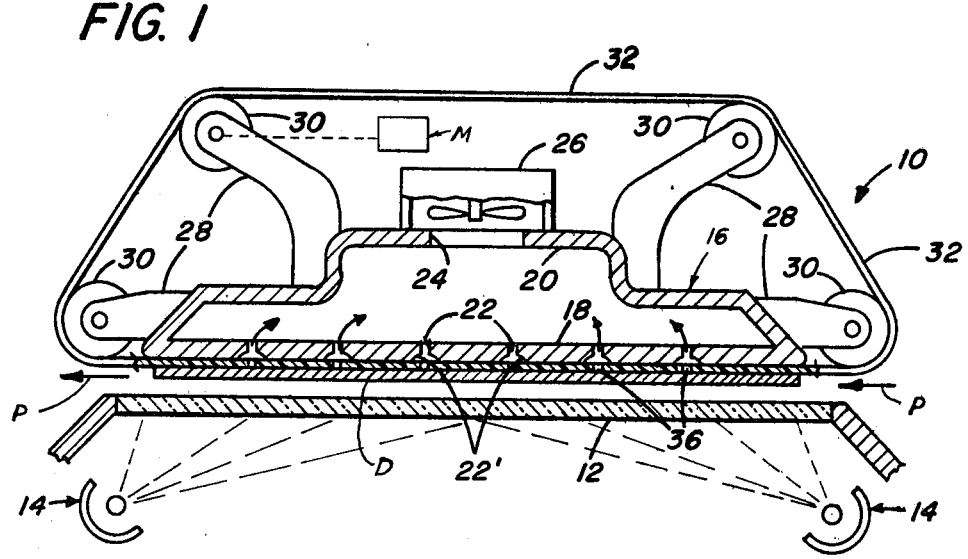
FIG. 1 is a side elevational view, partly in section, of a vacuum document feeder according to this invention.

Referring now to the drawings, FIG. 1 shows a vacuum document feeder 10 for transporting document pages (e.g., document page D) seriatim along the path in the direction of arrows P. The feeder is associated with a reproduction apparatus having a transparent platen 12 and exposure lamps 14 (shown schematically) for illuminating a document page overlying the platen to obtain a reflected light image of such page. The reproduction apparatus per se may be of any conventional type, such as an electrophotographic copier (see, for example U.S. Pat. No. 3,914,047 issued Oct. 21, 1975 in the names of Hunt, Jr. et al). Since the apparatus requires substantially no modification in order to be used with feeder 10, its details are not shown or described other than relative to the platen and lamps.

Figure 2:
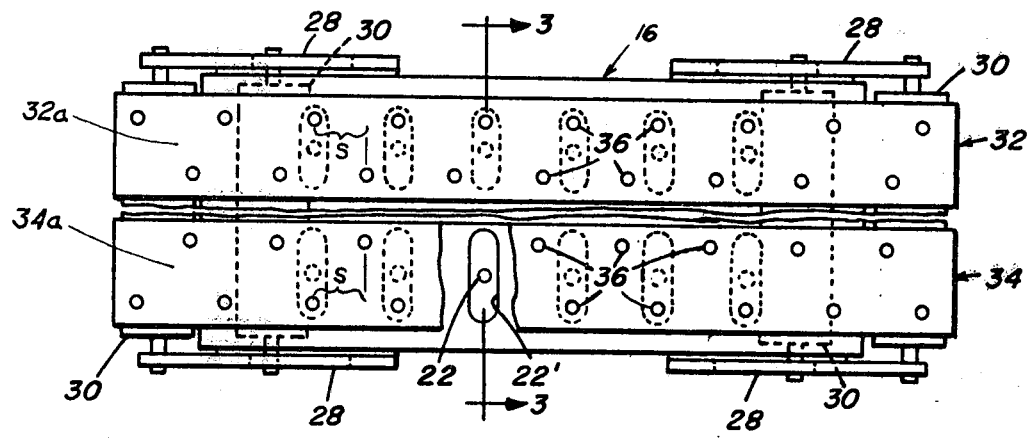
FIG. 2 is a bottom plan view of the vacuum document feeder of FIG. 1 with a portion broken away to facilitate viewing.
Figure 3:
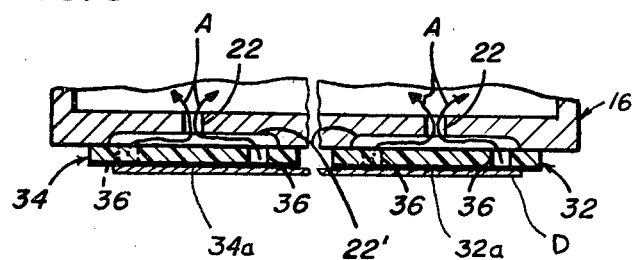
FIG. 3 is a cross-sectional view on an enlarged scale of a portion of the vacuum document feeder taken on lines 3—3 of FIG. 2 with a portion broken away to facilitate viewing.

The feeder 10 includes a vacuum plenum 16 located adjacent to the platen 12. The dimension of the plenum in the direction transverse to the path direction P is such that the plenum covers substantially the entire platen in such direction. Accordingly, to facilitate viewing, a portion of the plenum has been broken away in FIGS. 2 and 3. The plenum 16 comprises a vacuum chamber having first and second walls 18 and 20. The first wall 18 faces the platen 12 and has a series of ports 22 extending through such wall. The ports 22 are aligned in parallel rows (see FIG. 2) extending in the direction P of the page travel path. A plurality of shallow concave grooves 22' are formed in the surface of the wall 18 facing the platen. The plurality of grooves 22' intersect the plurality of ports 22 respectively and are oriented substantially transversely with respect to the direction of the travel path. The surface of the wall 18 facing the platen 12 and the surface of the grooves 22' are light reflective (specular or nonspecular).

The second wall 20 has a large opening 24, and supports a vacuum blower 26 adjacent to such opening. The vacuum blower 26 tends to evacuate the plenum chamber and draws air through the ports 22 (designated by arrows A in FIG. 3). The wall 20 also supports a plurality of brackets 28 which, in turn, carry support rollers 30. The rollers 30 support transport belts 32, 34 and define a course for such belts which has one run in juxtaposition with the grooved surface of the wall 18. One of the rollers 30 is driven by a motor M to cause the belts to traverse the defined course. The transport belts 32, 34, which may be formed of a light reflective (specular or nonspecular) polyethelene terepthalate web, include an area having a series of ports 36 (see FIG. 2) aligned in parallel spaced endless rows and a non-ported intermediate area 32a, 34a.

The transport belts 32, 34 are positioned on the rollers 30 so that as the belts are moved about their course, the ports 36 are maintained in spaced relation to the plenum ports 22. That is, the belt ports 36 traverse the grooves 22', and the ports 22 are optically masked by the solid (non-ported) intermediate area 32a, 34a of the belts. The belts are substantially wider than the dimension of the grooves in the direction transverse to the path. The spacing S between successive belt ports 36 is such that any one groove is fluidically interconnected with at least one of the belt ports at all times. Accordingly, air flow through ports 22 and grooves 22' is effective through belt ports 36 passing over the grooves to tack a document page (example, page D in FIGS. 1 and 3) to the belts 32, 34. The belts thus carry the page to the platen 12 where it can be illuminated by lamps 14 to obtain a reflected light image, such image being used by the reproduction apparatus to make copies of the page in a conventional manner.

It is, of course, clear that while two transport belts have been shown, any number of belts may be similarly employed, including a single belt. According to this invention, with a configuration having other than two belts, the belts (belt) must be selected to have a non-ported area covering the plenum ports and a ported area traversing the grooves associated with the plenum ports as the belts are driven about their course. The broken away portion of the plenum of FIGS. 2 and 3 may or may not include rows of ports and associated grooves depending upon the belt configuration. Further, while the grooves have been described as being in the plenum wall, the grooves could be formed in the belts and associated with the belt ports to fluidically interconnect the belt ports and the plenum wall ports.

If the document page does not fully cover the area of the transport belts illuminated by the lamps 14 during document page exposure, light is reflected from the area of the belts surrounding such page. Any light entering a port in the belt is also reflected since it strikes the reflective plenum wall 18 or shallow concave groove 22' behind such port. The belts, plenum wall and grooves 22' thus form a reflecting surface which prevents light trapping (and resultant undesirable artifacts appearing on the copies). On the other hand, if the page is thin enough to transmit light, such transmitted light is reflected off the belts, plenum wall and grooves 22' behind the ports 36 in the belts, in a similar manner, to prevent any trapping of such transmitted light. Thus undesirable artifacts are substantially reduced.

The invention has been described in detail with particular reference to a preferred embodiment, but it will be understood that variations and modifications can be effected within the spirit and scope of the invention.

We claim:

1. In a feeder for transporting a document page in juxtaposition to an illumination platen of a reproduction apparatus where such document page is illuminated to form a reflected light image thereof, said feeder including a vacuum plenum having a reflective wall defining a plurality of spaced ports overlying the illumination platen, the improvement comprising:
   a document page transport belt movable along said plenum wall in a direction to feed a document page to the platen, said belt having a reflective surface for contacting such document pages and a plurality of spaced ports located in spaced relation to the wall ports, and light reflective means operatively associated with said plenum wall and belt for fluidically interconnecting the wall ports and belt ports so that vacuum within the plenum is effective to tack a document page to said belt for movement therewith to the illumination platen and light trapping by such means during illumination is prevented.

2. The invention of claim 1 wherein said interconnecting means comprises a plurlity of shallow concave grooves defined by said reflective plenum wall and intersecting said plurality of ports respectively in said wall.

3. The invention of claim 1 wherein said wall ports are substantially linearly disposed in the direction of belt movement and said belt ports are similarly disposed.

4. A vacuum feeder for transporting document pages seriatim along a travel path to an illumination station of a reproduction apparatus where such pages are illuminated to form a reflected light image thereof, said feeder comprising:
   a vacuum plenum having a reflective wall overlying the illumination station, said wall defining a plurality of ports extending therethrough and a plurality of reflective shallow concave grooves facing such illumination station, said grooves intersecting said plurality of ports respectively and extending therefrom in a direction transverse to such travel path;
   an endless transport belt, said belt having a reflective surface for contacting the document pages and defining a plurality of ports extending therethrough and spaced along the belt to form at least one endless row; and
   means for moving said transport belt in contact with said wall of said vacuum plenum and for supporting the moving transport belt with the belt ports spaced from the wall ports and intersecting said grooves so that vacuum within said plenum is effective through such wall ports, grooves and belt ports for tacking a document page to said belt during movement to said illumination station, whereby when such document is illuminated at said station, light trapping by said plenum wall ports is prevented and light striking said wall, said grooves, and said belt is reflected.

5. In a feeder for transporting a document page in juxtaposition to an illumination platen of a reproduction apparatus where such document page is illuminated to form a reflected light image thereof, said feeder including a vacuum plenum having a reflective wall defining a plurality of spaced ports overlying the illumination plate, the improvement comprising:

a document page transport belt movable along said plenum wall in a direction to feed a document page to the platen, said belt having a reflective surface for contacting such document page and defining means, spaced from the wall ports, providing fluidic passage between said reflective surface and the opposite surface of said belt; and light reflective means operatively associated with said plenum wall and belt for fluidically interconnecting the wall ports and said passage defining means so that vacuum within the plenum is effective to tack a document page to said belt for movement therewith to the illumination platen, and light trapping by such reflective means during illumination is prevented.

* * * * *